United States Patent [19]

Kern

[11] 3,967,115

[45] June 29, 1976

[54] ATOMIC BEAM TUBE

[75] Inventor: Robert H. Kern, Danvers, Mass.

[73] Assignee: Frequency & Time Systems, Inc., Danvers, Mass.

[22] Filed: Oct. 9, 1974

[21] Appl. No.: 513,289

[52] U.S. Cl. .................................. 250/251; 331/3; 331/94

[51] Int. Cl.[2] .......................................... H01S 1/00

[58] Field of Search .................. 250/251; 331/3, 94

[56] References Cited

UNITED STATES PATENTS

| | | | |
|---|---|---|---|
| 2,991,389 | 7/1961 | Grant et al. ......................... | 250/251 |
| 3,397,310 | 8/1968 | Hollaway et al. .................. | 250/251 |
| 3,670,171 | 6/1972 | Lacey et al. ....................... | 250/251 |

*Primary Examiner*—James W. Lawrence

*Assistant Examiner*—T. N. Grigsby

[57] ABSTRACT

An atomic beam tube provides a single sealed envelope structure that serves both as vacuum envelope and as structural member to which the operative components are attached. The envelope is composed of a heavy and relatively rigid frame and a relatively thin and flexible cover sealed to the frame. The operative elements are separately assembled in independent subassembly units which are secured to the frame at a minimum of locations to provide fixed alignment and thermal isolation of the operative elements, and easy disassembly of the tube.

6 Claims, 25 Drawing Figures

FIG 13
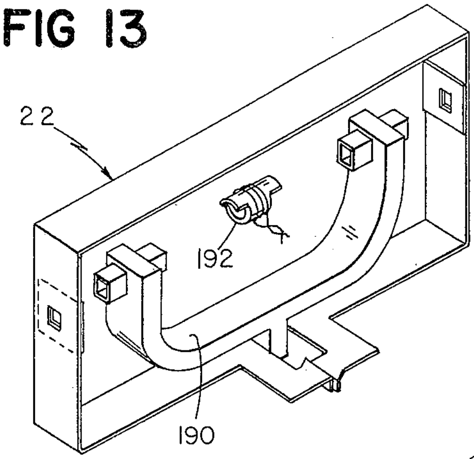
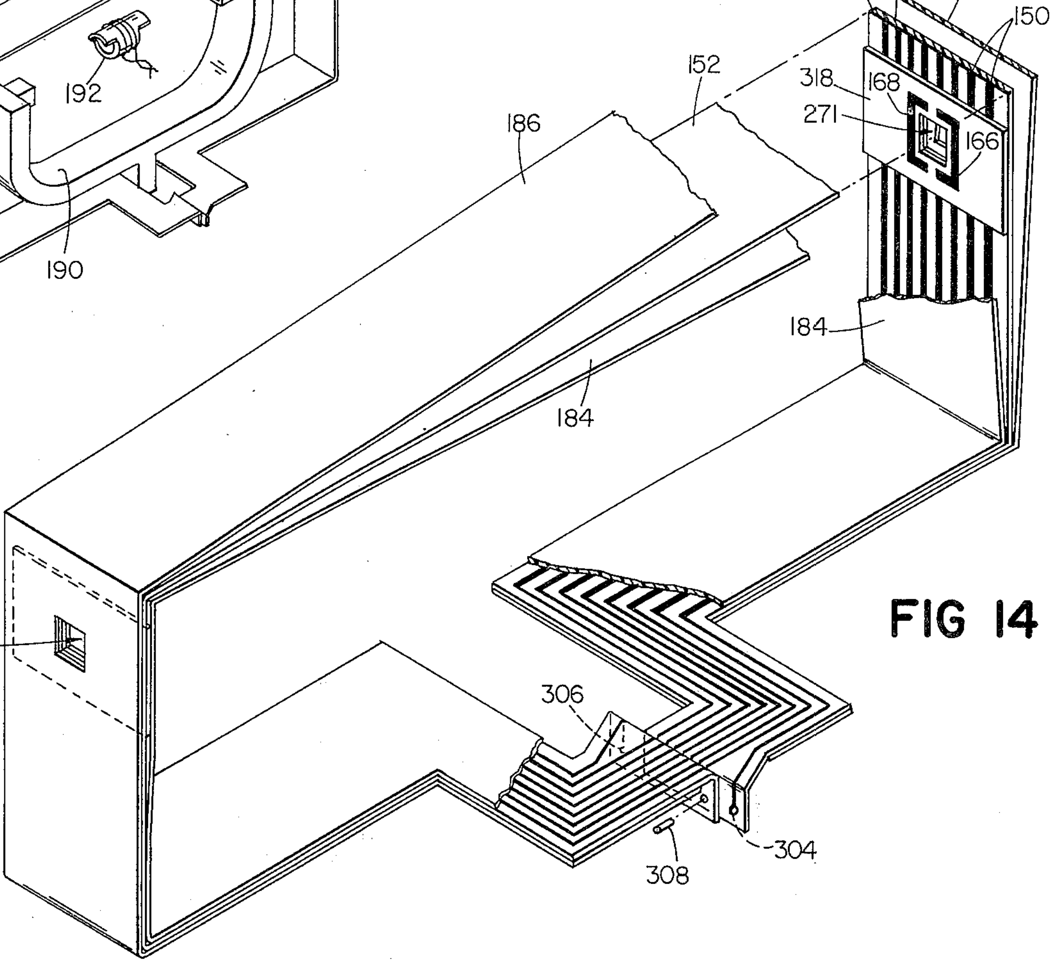
FIG 14
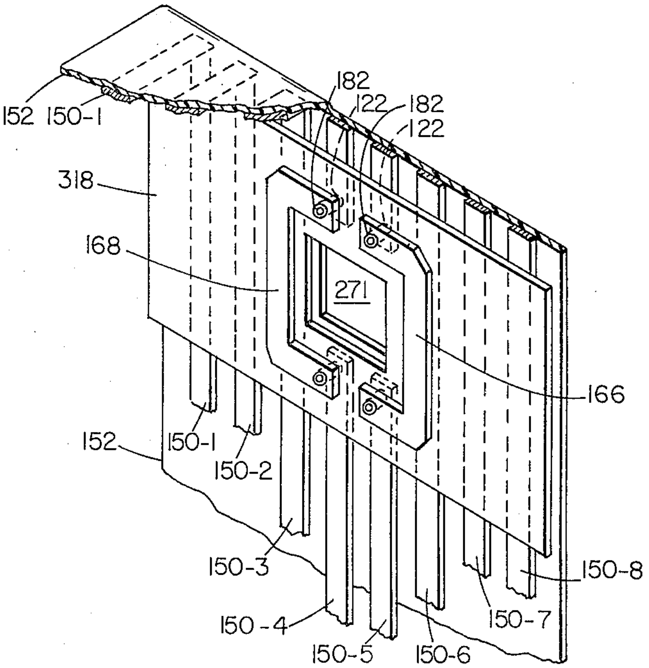
FIG 17

FIG 21
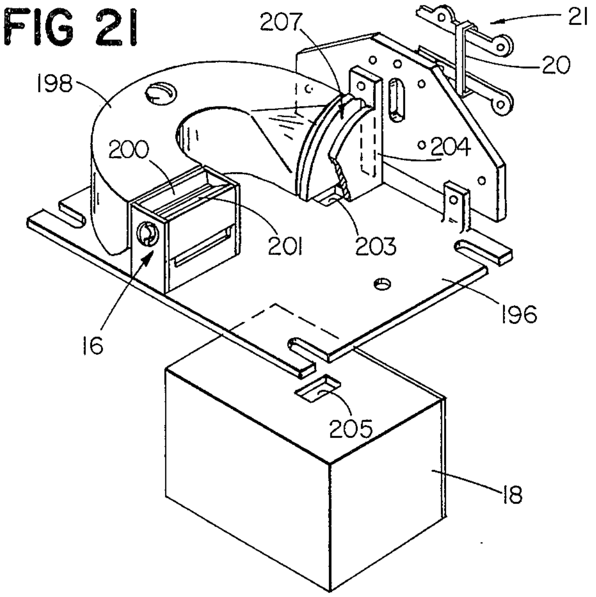
FIG 20
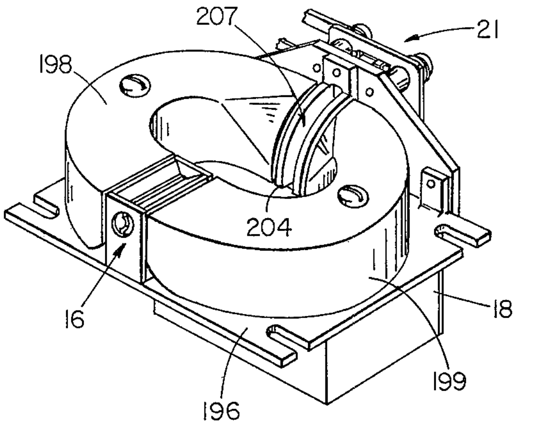
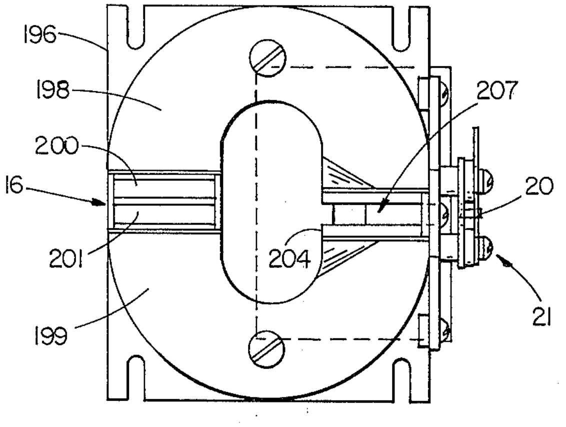
FIG 22
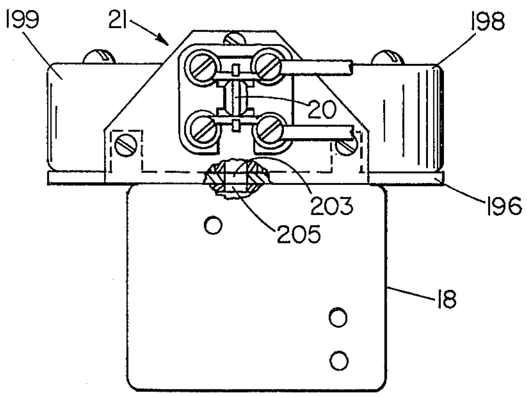
FIG 23

ATOMIC BEAM TUBE

This invention relates, in general, to atomic beam apparatus, and, more particularly, to atomic beam tubes which utilize magnetic hyperfine resonance transitions.

Atomic beam tubes are the basic frequency determining elements in extremely stable frequency standards. Fundamentally, an atomic beam frequency standard detects a resonance within a hyperfine state of the atom to obtain a standard frequency. To utilize this resonance, atomic particles, such as cesium atoms, in a beam interact with electromagnetic radiation in such a manner that when the frequency of the applied electromagnetic radiation is at the resonance frequency associated with a change of state in the particular atoms, the atoms in selected atomic states are deflected into a suitable detector. The frequency of the applied radiation is modulated about the precise atomic resonance frequency to produce a signal from the detector circuitry suitable for the servo control of a flywheel oscillator. Control circuitry is thus employed to lock the center frequency of the applied radiation to the atomic resonance line.

When cesium atoms are employed in an atomic beam tube, the particular resonance of interest is that of the transition between two hyperfine levels resulting from the interaction between the nuclear magnetic dipole and the spin magnetic dipole of the valence electron. Only two stable configurations of the cesium atom exist in nature, in which the dipoles are either parallel or anti-parallel, corresponding to two allowed quantum states. Thus, in the absence of an external magnetic field, there are two hyperfine energy levels, each of which may be split by an external magnetic field into a number of Zeeman sublevels.

The hyperfine resonance transition used in the atomic beam tube of the present invention occurs between the ($F$=4, $m_F = 0$) and ($F$=3, $m_F = 0$) states, where the first number F is related to the magnitude of the total angular momentum of the atom (electronic plus nuclear) while the second number $m_F$ is related to the component of this total angular momentum which is in the direction of the applied external magnetic field.

To cause a transition from one state to the other, an amount of energy E equal to the difference in energy of orientation must be either given to or taken from the atom. Since all cesium atoms are identical, E is the same for every atom. The frequency $f$ of the electromagnetic energy required to cause a change of state is given by the equation $E=hf$, where $h$ is Planck's constant. For cesium, the magnitude of $f$ is approximately 9,192.631770 megacycles.

A conventional cesium atomic beam apparatus provides a source from which cesium evaporates through a collimator which forms the vapor into a narrow beam and directs it through the beam tube.

This collimated beam of atoms is acted upon by a first state selecting magnet or "A" magnet, which provides a strongly inhomogeneous magnetic field. The direction of the force experienced by a cesium atom in such a field depends on the state of the atom. In this field, the energy states $F$=3 and $F$=4 are split up into sublevels. All of the atoms of the $F$=4 state, except those for which $m_F = -4$, are deflected in one direction, and all other atoms are deflected in the other direction. In the apparatus of the present invention, the $F$=3 group (together with the atoms of the (4, −4) sublevel) are retained in the beam, while the others are discarded. The undiscarded atoms include those of the (3,0) sublevel.

Upon emergence from the A-field, those atoms enter a central region where they are subjected to a weak uniform C-field to assure the separation in energy of the $m_F = 0$ states from the nearby states for which $m_F \neq 0$. This small magnetic field also serves to establish the spatial orientation of the selected cesium atoms and, therefore, the required direction of the microwave magnetic field.

While in this uniform weak field region, the cesium beam is subjected to an oscillating externally generated field of approximately the resonance frequency required to cause transitions from the (3,0) to the (4,0) sublevel.

After leaving this energy transfer region, the beam is acted on by a second state-selecting magnet, similar to the A-magnet, producing a strong inhomogeneous field. Here the atoms of all the $F$=3 groups (and also those of the (4, −4) sublevel) are discarded. The only undiscarded atoms are those of the (4,0) sublevel, which exist at this point only because of the induced transition described above. These atoms are allowed to proceed toward a detector of any suitable type, preferably of the hot-wire ionizer mass spectometer type.

The magnitude of the detector current, which is critically dependent upon the closeness to resonance of the applied RF frequency, is used after suitable amplification to drive a servo system to control the frequency of the oscillator/multiplier which excites the RF cavity.

Cesium beam tubes as hitherto constructed have been expensive and difficult to make. To provide a cesium beam tube suitable for use in the usual applications of atomic frequency standards, mechanical alignment of components is critical, and shifts in the alignment can destroy the functional frequency standard. The tube elements that have been described must be assembled and supported in place with a high degree of precision, alignment requirements relative to the beam deflection axis of the tube being approximately 0.001 inch for effective tube operation. The precise alignment must be preserved under conditions of mechanical vibration and shock, and of a range of temperature variations typical of practical applications of the tube. Prior art tubes have employed complicated mounting means between the inner structural assembly of tube elements and either an inner or an outer vacuum-tight envelope in an effort to meet the often-conflicting requirements of rigidity against mechanical shock or vibration, and flexibility to accommodate to differential expansion disturbance forces in the presence of thermal gradients resulting from bake out in tube processing and ambient temperatures in normal tube operation. A further limitation in prior art tubes is that these structure measures typically result in relatively large and heavy tubes, characteristics that are most undesirable for certain important applications such as in air space craft.

Some prior art cesium tubes have been constructed using two separate envelopes. The first is an inner mounting channel to which the operative components are secured to provide mechanical stability and thermal isolation; this inner envelope is suspended within an outer vacuum envelope. Since differential movement between the two envelopes must be allowed for, such a compound structure adds complexity to the manufacturing process. This design also results in a relatively weak mechanical structure.

The present invention integrates the inner assembly and the vacuum envelope into a single structure, thereby eliminating the need for support elements between the two. It further provides for a modular assembly in which three subassembly units are assembled to the main structural member (which is also a portion of the vacuum envelope) by means of 10 machine screws, as will be described. The invention also includes novel features providing good thermal isolation, smaller and more efficient magnetic structures, smoother transition between strong and weak magnetic fields, and means to feed in RF energy with less perturbation of the C-magnetic field than in prior art tubes. These novel features make possible a tube, both more compatible with typical operating environments than conventional devices, and lighter in weight (9 lbs. against the 16 lbs. of a typical prior-art tube).

The design of the present invention eliminates the need for expensive and complex internal support structures while providing a beam tube of simple modular design that maintains beam alignment and is highly resistant to external mechanical disturbances such as shock and vibration. At the same time, the design of the present invention provides excellent thermal isolation for the thermally sensitive components.

The atomic beam tube of the present invention provides a single structure that serves both as vacuum envelope and as structural member for the operative components. This envelope is composed of a heavy and relatively rigid frame and a relatively thin and flexible cover sealed to the frame. The operative elements of the tube are secured to the frame; this provides fixed alignment of these elements. The flexible cover accommodates itself readily to externally caused mechanical distortions without transmitting them to the frame or to the operative elements. The sealed unit acts as a vacuum envelope. The operative elements of the tube are secured to the heavy frame at a minimum of locations, and the connections have low thermal conductivity, in order to isolate the operative elements thermally from the environment. For example, the oven structure is secured to the frame through a connecting structure that is designed to provide a relatively long thermal path to the environment.

It is industry practice to disassemble such tubes when they are no longer operable (generally because the cesium getters are saturated) in order to salvage reuseable components. To disassemble prior art tubes has required extensive machining which is both time-consuming and expensive, involving high labor costs. In the cesium beam tube of the present invention, the operative parts are provided in three main modular subassemblies, secured to the frame by a total of 10 screws, for quick and simple disassembly and reuse of the modular portions.

The operation of the cesium beam tube, as has been described, requires that the A and B magnets provide very strong fields (of the order of 10 kilogauss), while the C-field in the region between them must be relatively weak (of the order of 0.060 gauss) and as uniform as possible. Discontinuities in the C-field are particularly likely to occur in the regions at which the beam enters and leaves the C-region, and can cause spontaneous transitions (Magorana transitions) in the atomic beam which may distort the performance of the tube. The present invention provides a C-field winding of novel design that generates a C-field of superior uniformity at the beam apertures.

In general, it is desirable to provide a cesium beam tube that is as compact, light weight, and simple as possible. The particular designs of the A and B magnets in the present invention realize such construction and are particularly adapted to the modular assembly previously described.

It is typical in the assembly and processing of molecular beam tubes to confine the source of the molecular beam material in a sealed ampoule during the bakeout and exhaust part of the processing cycle, and as a final stage, while the tube is still being pumped, but after bakeout has been completed, to open the ampoule. Any gases released in the opening process can then be pumped prior to the final sealing off of the tube.

A number of methods have been used in the prior art for opening the ampoule. One such method is to provide means whereby a member of the ampoule is ruptured when electrical energy is applied to a heating coil to cause expansion in a member mechanically linked to a rupturing element. A more sophisticated prior art method is to discharge an external capacitor through electrical conducting paths into the tube, so arranged that a vaporizing arc is created at a member of the ampoule which is ruptured by the heat of the arc. Both of these methods require the inclusion in the beam tube of additional parts that are used only for this one operation; in particular, means must be provided to transmit electrical energy through the vacuum envelope, which complicates the construction of the tube.

The present invention provides a novel ampoule structure and novel means for opening the ampoule that require no additional parts; in particular, no additional electrical or mechanical feeds through the vacuum envelope are required.

Other objects, features, and advantages will appear from the following description of a preferred embodiment of the invention, taken together with attached drawings thereof, in which:

FIG. 13 is a perspective view of the microwave structure and C-field coil;

FIG. 14 is a perspective view of the C-field coil with portions broken away;

FIG. 17 is a detail of the conductors of the C-field coil at a beam aperture;

FIG. 20 is a perspective view of the B-field magnet and the detector;

FIG. 21 shows the elements of FIG. 20 with support structure;

FIGS. 22 and 23 are a plan view and a rear elevation view of the B-field magnet and the detector;

GENERAL

Figure 1:
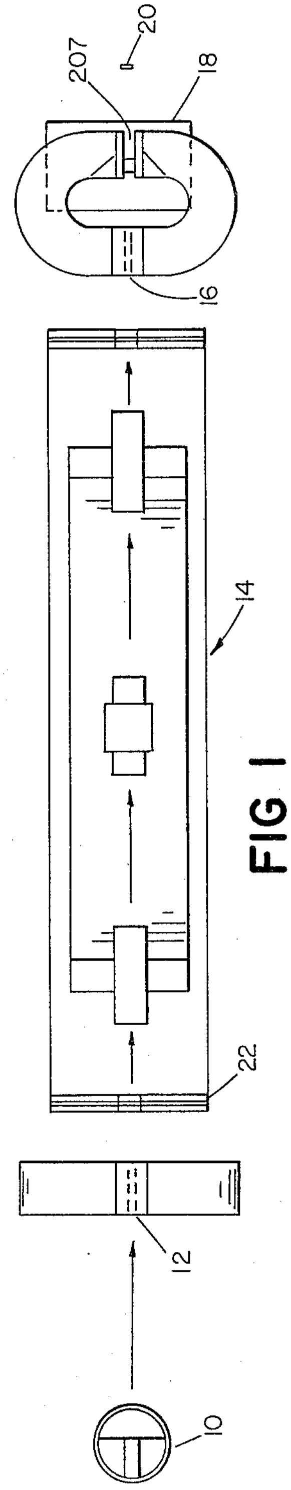
FIG. 1 is a schematic view of the principal beam-forming and detecting elements of the tube.
Figure 2:
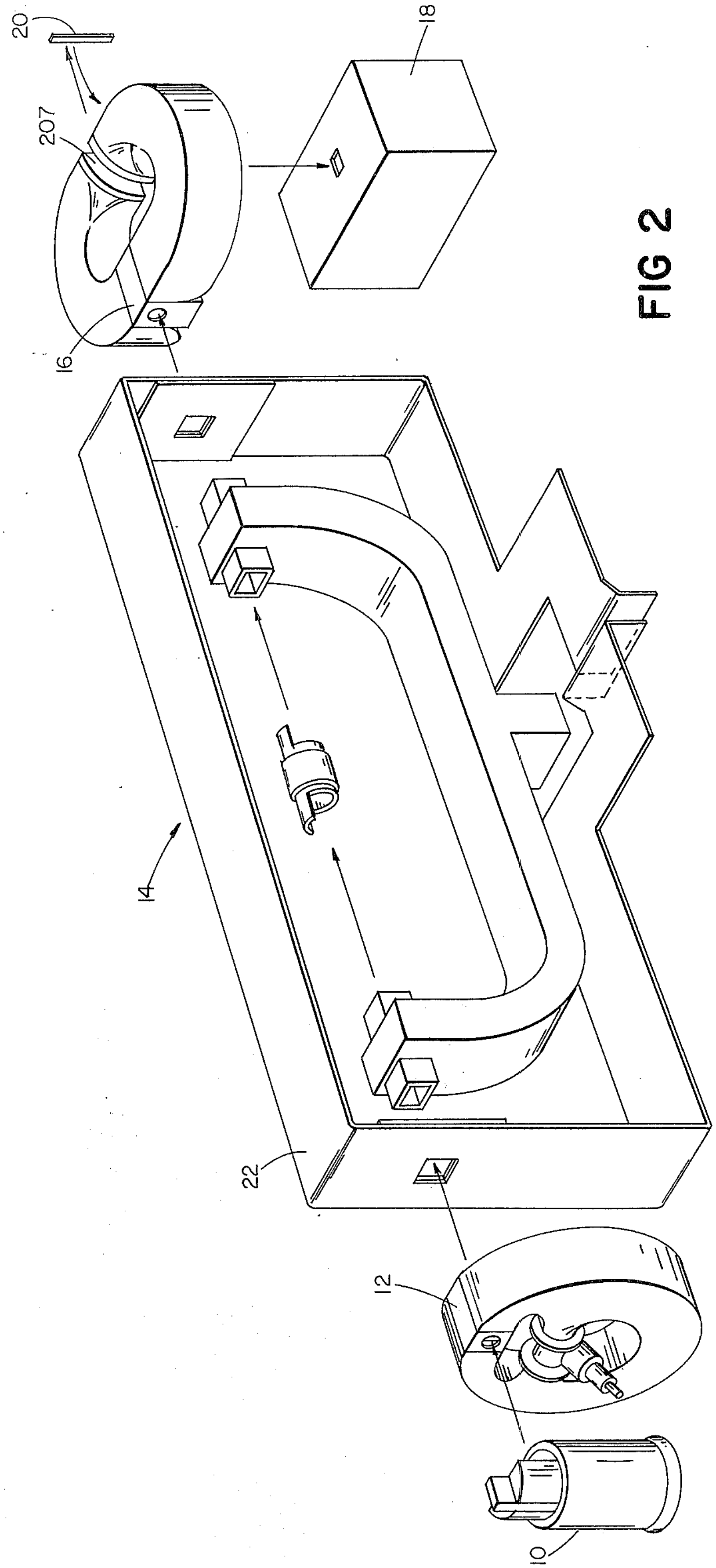
FIG. 2 is a perspective view of the elements of FIG. 1.
Figure 3:
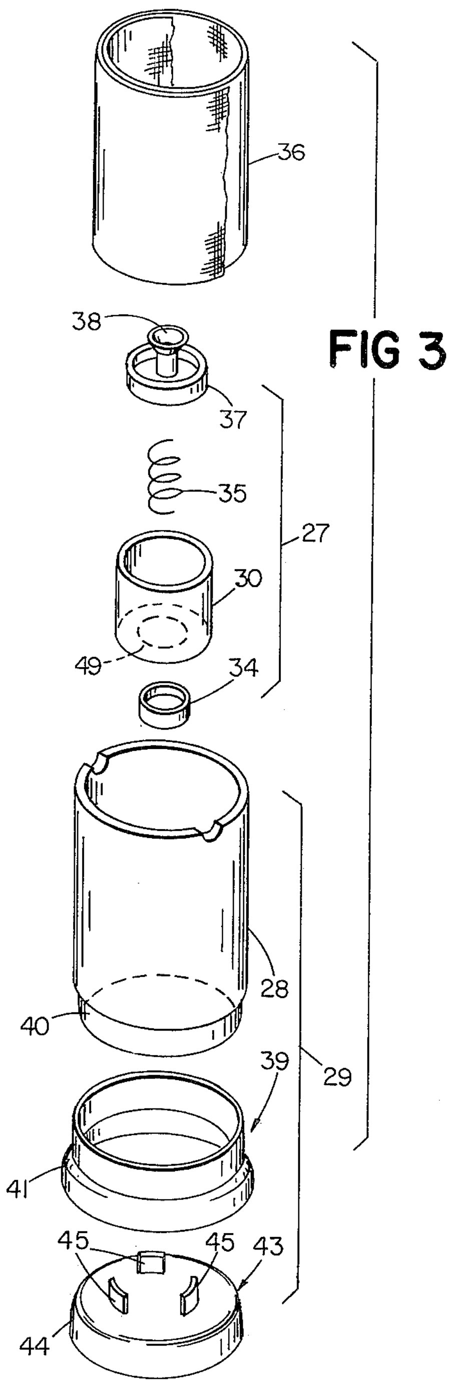
FIG. 3 is an exploded view of the components of the oven and ampoule.
Figure 4:
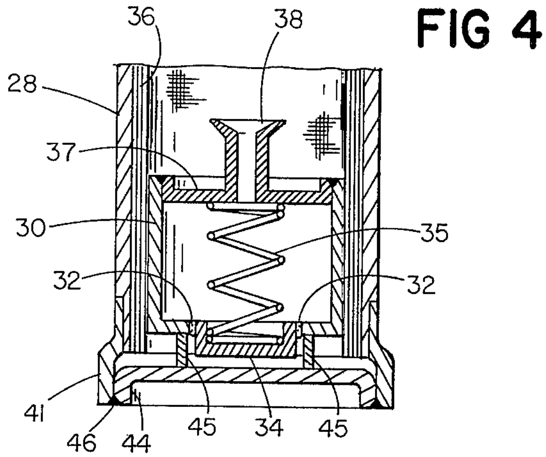
FIG. 4 is a cross section of the ampoule.
Figure 5:
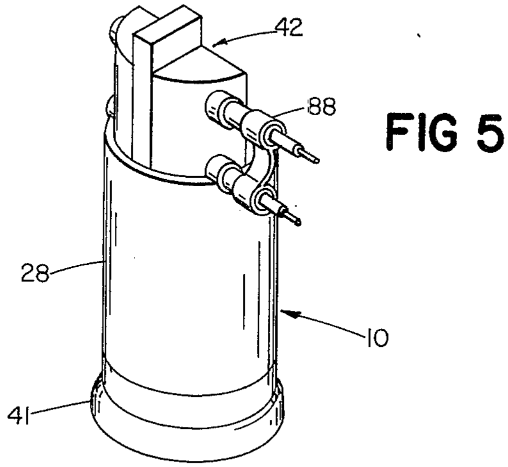
FIG. 5 is a view of the assembled oven.
Figure 6:
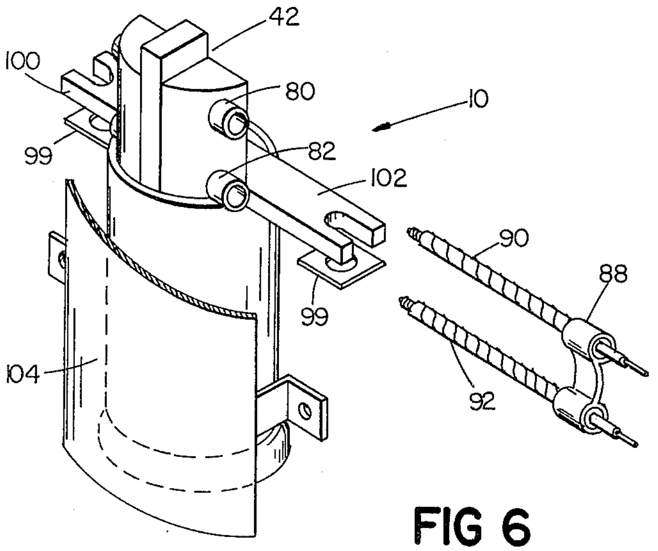
FIG. 6 is a view of the oven with reflector and support structure.
Figure 7:
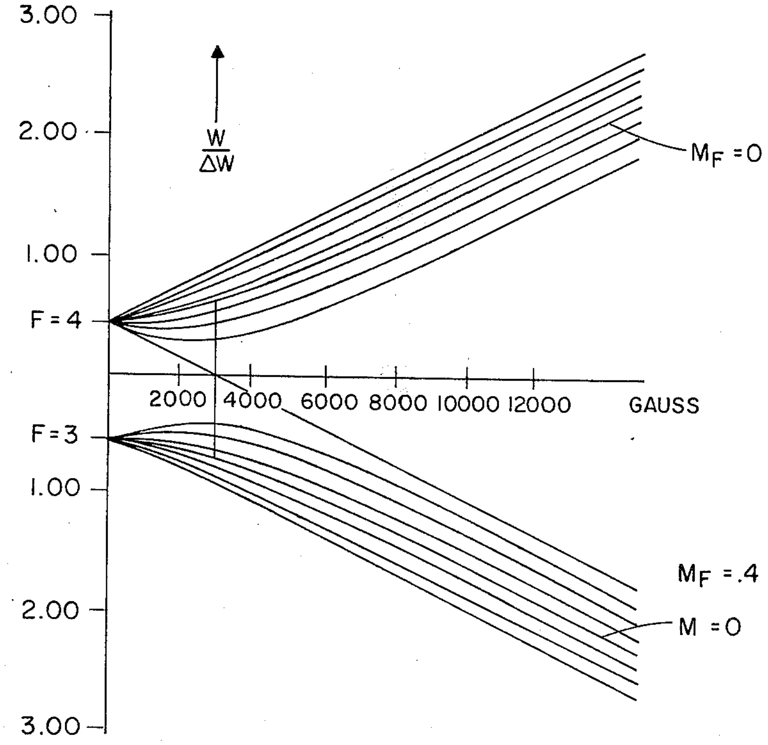
FIG. 7 is a Zeeman energy diagram for cesium 133 in the ground electronic state, showing the transition induced in the beam tube of the invention.
Figure 9:
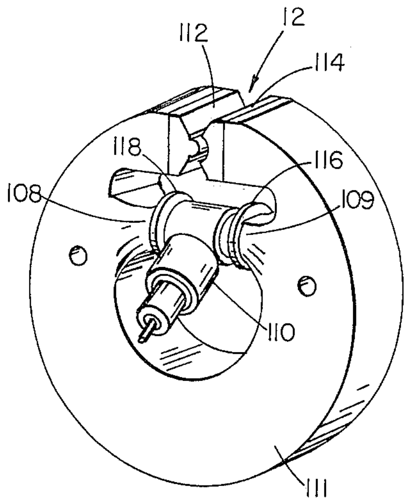
FIG. 9 is a perspective view of the first state selector magnet and ion pump.
Figure 11:
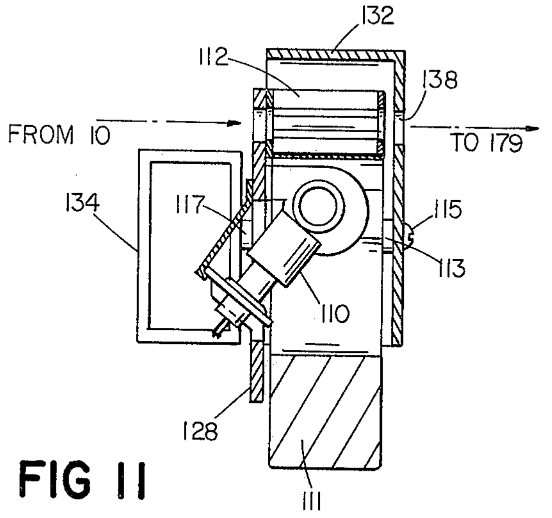
FIGS. 11 and 12 are longitudinal and cross sections respectively of the first state selector and ion pump.
Figure 12:
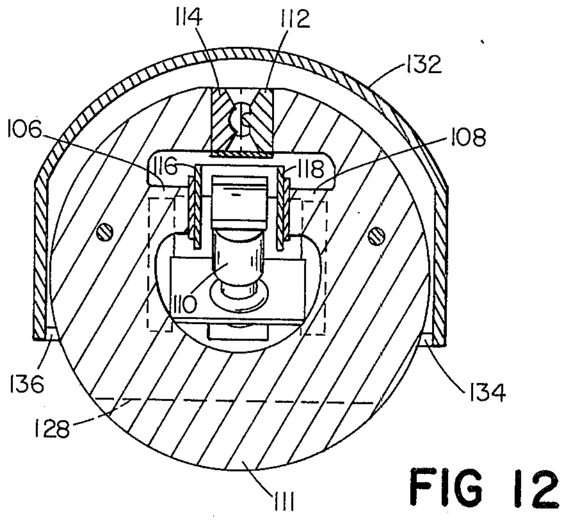
Figure 10:
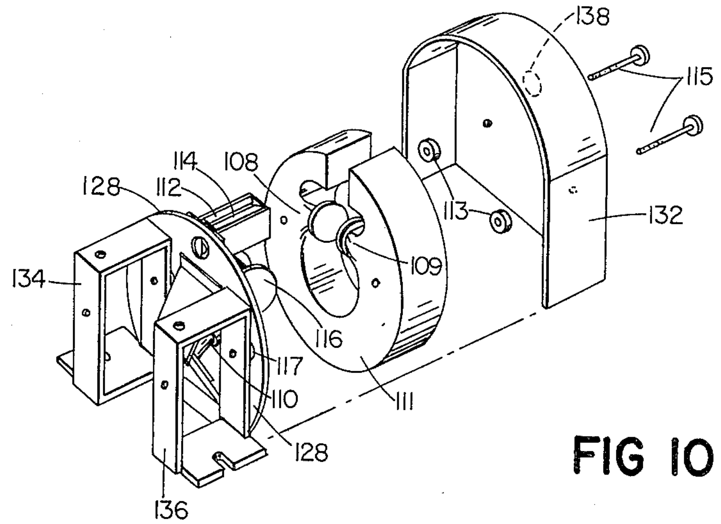
FIG. 10 is an exploded perspective view of the first state selector magnet together with shielding and support structure.

Referring to the drawings, and particularly to FIGS. 1 and 2, the basic beam-forming and detecting elements of the cesium tube 11 of the invention are shown schematically and in perspective. A source of atomic particles includes an oven 10 which evaporates liquid cesium and emits (through a collimator) a beam of neutral cesium atoms which are statistically distributed between two stable energy states, as previously described. The first state selector or A magnet 12 splits these energy states into sublevels and selects the atoms in the F=3 states (together with those in the (4, −4) sublevel) and deflects the remaining atoms so that they no longer form part of the beam. The beam of selected atoms then passes through the RF interaction section 14; in this region a weak homogeneous magnetic field (C-field) is supplied by the winding 22. Microwave energy is supplied at the resonance frequency to induce transitions of some of the beam atoms from the (3,0) state to the (4,0) state (FIG. 7). The beam atoms in the (4,0) state are then selected by the second state selector or B magnet 16, the atoms in the remaining states being deflected out of the beam. The cesium atoms selected by the B magnet strike the hot wire ionizer 20, and an electron is stripped from each cesium atom, causing the re-emission of cesium ions, which are accelerated through a mass spectrometer 207 into the electron multiplier 18. The electron multiplier provides an output current proportional to the number of atoms arriving at the hot wire 20, that is, proportional to the number of atoms that have been raised to the second state in the microwave cavity.

Figure 8:
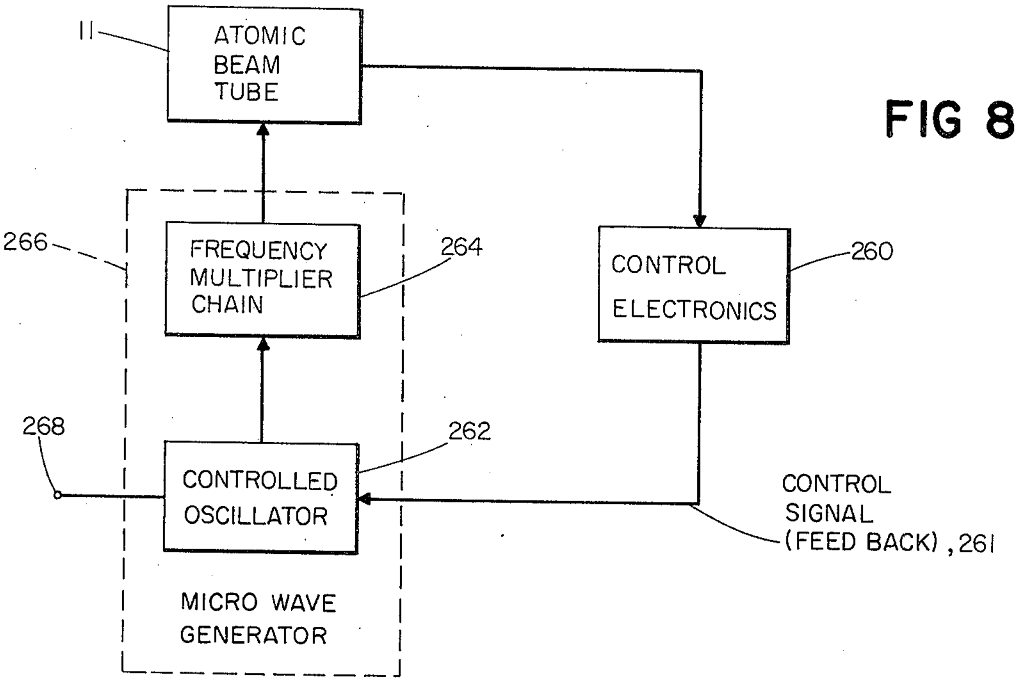
FIG. 8 is a schematic view of the control circuitry used with the cesium beam tube of the invention.

As shown in FIG. 8, the output of the atomic beam tube 11 is fed to control electronics 260 which produce a suitable error output signal 261, which is applied to a crystal oscillator 262. The frequency output of the crystal oscillator (typically 5 megahertz) is controlled by the processed signal 261 from the cesium beam tube, and then multiplied in the frequency multiplier chain 264 and applied to tube 11, at the precise resonance frequency (typically 9192 mHz). Multiplier chain 264 and the controlled oscillator 262 from the microwave generator 266. The usable output signal is derived from controlled oscillator 262 at 268.

SUMMARY OF MODULAR COMPONENTS

The elements that have been described and shown in FIG. 8 are in general terms old and well-known in the art. The cesium tube of the invention provides three modular subassemblies including a cesium ampoule and a first state selector magnet in combination with the ion pump, a second state selector magnet in combination with the mass spectrometer, and a C-field winding and microwave structure, all of novel design, as well as a novel outer package for the entire tube.

Figure 25:
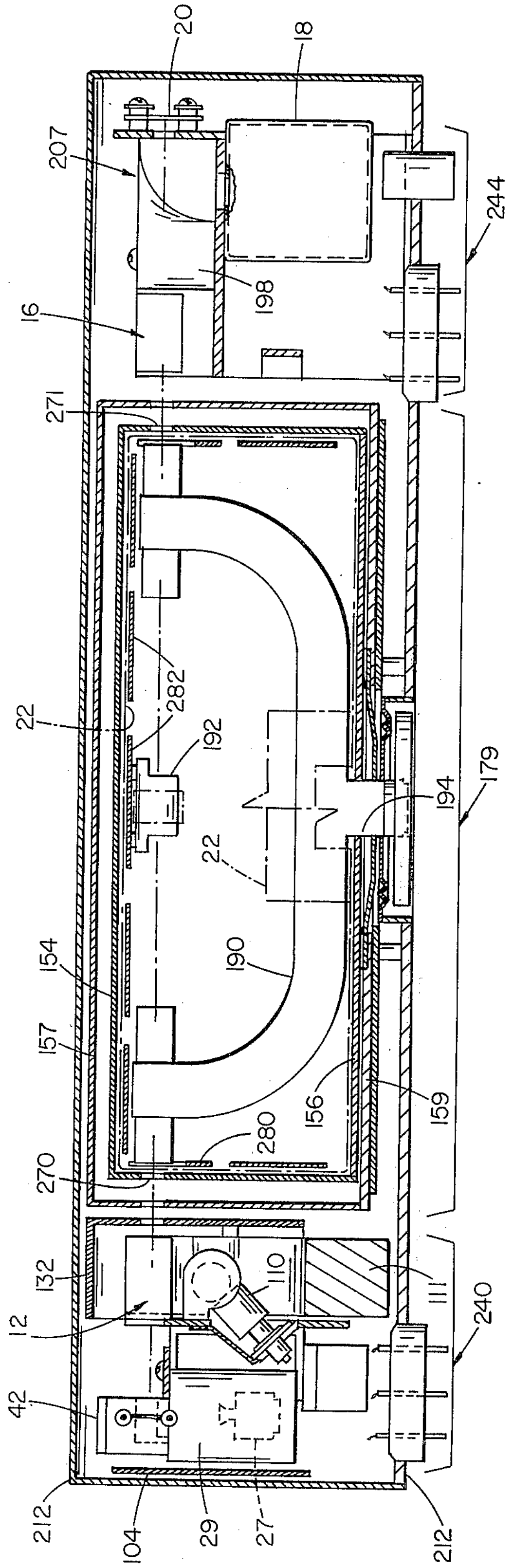
FIG. 25 is a longitudinal view partly in section of the assembled units of FIG. 24.
Figure 24:
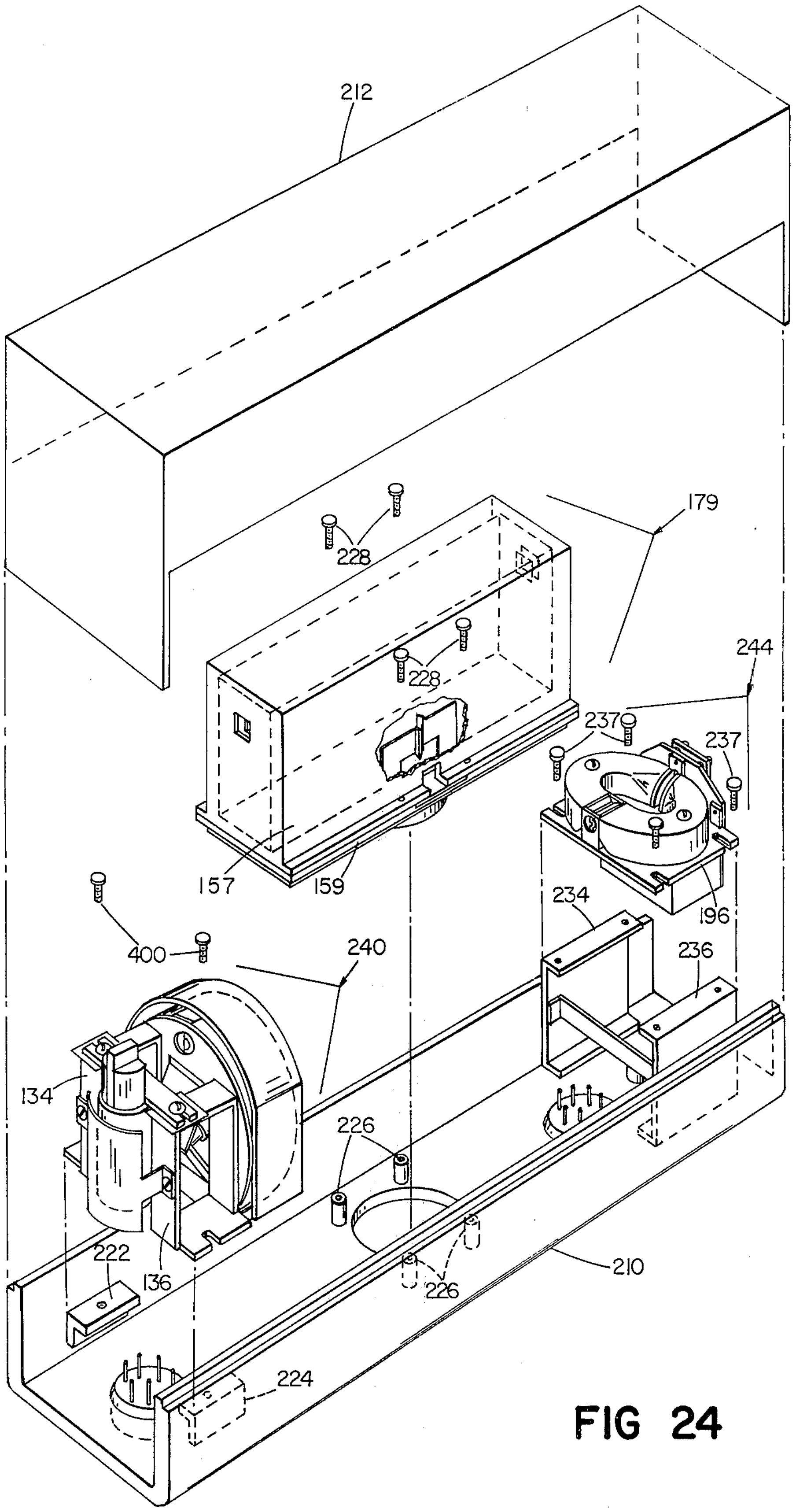
FIG. 24 is an exploded view of the outer packaging and connections and the modular units.

To provide the advantages of the modular assembly of the invention, as previously described, the oven 10 (with cesium ampoule) and A-magnet 12 (with ion pump), shown separately in the schematic views of FIGS. 1 and 2, are combined in an oven/A-magnet assembly module 240 (FIG. 24). The RF interaction region 14 and C-field, shown unenclosed in FIGS. 1 and 2, are contained in magnetic shield package 179 (FIG. 24). The B-magnet 16, hot wire ionizer 20, mass spectrometer 207 and electron multiplier 18 are packaged together in a detector assembly module 244 (FIG. 24). Referring to FIGS. 24 and 25, modules 240 and 244 and magnetic shield package 179 are essentially independent of one another and constitute the subassembly units within the outer package of the beam tube, and are assembled thereto by means of 10 screws, as will be described.

The details of each of these modular components are described below.

Oven/A-magnet module: oven and ampoule

The structure of the novel oven-ampoule assembly 10 of the invention, constituting a source for providing a beam of cesium particles, is shown in detail in FIGS. 3–6. The assembly 10 includes collimating means 42, not described, and oven means including a reservoir 29 containing an ampoule 27. The ampoule 27 includes a thin walled (0.015 inch) generally cylindrical shell 30 and a top 37 including a fill tube 38. Top 37 and cylinder 30 together form an enclosure.

The end of shell 30 opposite to top 37 provides an opening 49. A cup shaped base 34 is sealed into shell opening 49 by an eutectic metal 32 designed to fail mechanically at a temperature of approximately 600°C. An example of such an eutectic metal is an alloy of 45% copper and 55% indium. A weak spring 35 is compressed between base 32 and top 37.

After the enclosure has been filled with liquid cesium, fill tube 38 is closed by pinching and heliarc welding.

A wire screen mesh 36 having high thermal conductivity surrounds ampoule 27 within reservoir 29. The mesh 36 serves both as a heat transfer element and as a retaining and support element for the ampoule.

Ampoule 27 is supported within reservoir 29. A copper outer cylinder 28 of reservoir 29 includes an annular recess 40 at its lower portion. A welding adaptor 39 having a lower flange 41 is brazed to recess 40 of outer cylinder 28. An ampoule support member 43 includes an inverted cup portion 44 and three spaced supports 45. Inverted cup portion 44 of member 43 is heliarc welded at 46 (FIG. 4) to the inner surface of welding adaptor flange 41 to seal the lower end of reservoir 29. This creates an enclosed reservoir space 51 surrounding base 34 and communicating with mesh 36. Ampoule 27 is seated in support member 43 with ampoule base 34 within spaced supports 45.

Two tantalum heaters 90 and 92, retained in a ceramic support structure 88, are inserted into collimator assembly 42 through quartz tubes 80 and 82. The ampoule is opened, after bakeout of the beam tube, by means of these heaters, which heat the ampoule to 600°C, at which temperature the eutectic seal fails. The combination of the vapor pressure of the cesium within ampoule 27 and the force of compressed weak spring 35 exerts a stress greater than the working stress of the metal of seal 32 and pushes base 34 out of shell 30, thereby releasing the cesium in the ampoule. Weak spring 35 prevents the base from settling back into place, resealing the ampoule.

In later operation of the tube, tantalum heaters 90 and 92 are used to warm the entire oven assembly 10 to the operating temperature, typically about 90°C. At this temperature the liquid cesium in reservoir space 51 slowly vaporizes and diffuses from the mesh 36 to collimating means 42. Collimator 42 is functionally equivalent to a bundle of small tubes so oriented that a directed beam of cesium atoms emerges. Construction of collimating means is well known in the art, and will not be detailed here.

The oven support structure is designed to provide thermal isolation from outside the beam tube. Since the oven operates in a vacuum, there is no heat loss from convection; the major loss is by radiation, with some loss by conduction. The oven support structure is therefore constructed of material of poor thermal conductivity such as stainless steel and includes ear portions 100 and 102 for securing oven 10 to the A-magnet assembly, as will be described. Additionally, 0.003 inch Kapton shims 99 between the ear portions of the support structure and the A-magnet assembly further discourage thermal condition. A radiation shield 104 of highly polished aluminum surrounds the major portion of the oven, and prevents radiation heat loss from the oven. An oven of the design described requires less than two watts for operation.

Oven/A-magnet module: A-magnet and ion pump

Referring now to FIGS. 9 through 12, a permanent magnet driver 111 is shared by the first state selector magnet (A magnet) 12 and the ion pump 110. The ion pump performs the well-known function of removing undesired gasses and maintaining tube vacuum during operation. Permanent magnet 111 is generally of a typical "C" shape, but with a novel reentrant inner surface shape that gives it the distinguishing capability of providing proper fields for both selection and ion pumping. The axis of magnet 111 is parallel with the beam.

"Dipole configuration" soft iron pole pieces 112 and 114, of a well-known design, are secured in the gap of "C" shaped permanent magnet 111, and provide the inhomogeneous deflecting field of first state selector 12.

Reentrant extensions 108 and 109 of permanent magnet 111 extend inwardly toward one another, and in conjunction with a second pair of short cylindrical pole pieces 116 and 118 provide the field for the ion pump 110, located between pieces 116 and 118. The ion pump is of any suitable design and is well known.

Permanent magnet 111 provides in effect two permanent magnet circuits in parallel to drive both the "A" state selector 12 and the ion pump 110. The magnetic driver is designed to provide approximately 10 K gauss in the state selector circuit while providing approximately 1000 gauss for the ion pump. The compact arrangement of this combination permits the atomic beam tube assembly to be smaller, lighter, and less expensive than those hitherto constructed, and is also especially adapted to the modular design of the present beam tube apparatus.

A magnetic shield 132 covers approximately the upper half of the outer surface of magnet 111 and additionally on one end is interposed between the magnet and the C-field/microwave structure module 179 (FIG. 24). Shield 132 provides aperture 138 for the passage of the atomic beam from the A-magnet 12 to module 179. The structure of shield 132 further provides field control for the attenuation of the 10 Kgauss deflecting field of the A-magnet down to the 0.060 gauss C-field in the RF transition region 14.

A mounting plate 128 is secured to the upstream side of permanent magnet 111, and provides brackets 134 and 136. Magnetic shield 132, stainless steel spacers 113, magnet 111, and another pair of stainless steel spacers 117 all are fastened together by a pair of machine screws 115 passing through clearance holes in each and threading into tapped holes in mounting plate 128.

Oven 10 (FIG. 6) is secured by its support structure ear portions 110 and 102 to brackets 134 and 136. As these brackets are open in construction, rather than solid, they provide a relatively long thermal path for the conduction of heat from the oven through the brackets to the eventual point of contact with the outer frame of the beam tube. Shims 99 of 0.003 inch Kapton are interposed between ears 100 and 102 and brackets 134 and 136 and provide further thermal insulation.

Oven 10 and A-magnet 12 with ion pump 110 form the oven/A-magnet module 240 (FIG. 24).

C-field/Microwave Structure module

Referring again to FIGS. 1, 2 and 4, the C-field and RF (radio frequency) transition section 14, including magnetic shields to be described, are packaged together as a second module 179.

As previously described in connection with FIG. 2, the cesium atoms that are selected by the A-magnet 12 form a beam that must next pass through RF transition section 14. In this region a weak homogeneous magnetic field (C-field) of approximately 0.06 gauss directed transverse to the beam path is provided by a single-layer printed circuit solenoid 22 of novel design. The construction and mounting supports of this solenoid will be described by reference to FIGS. 13 through 19.

Figure 15:
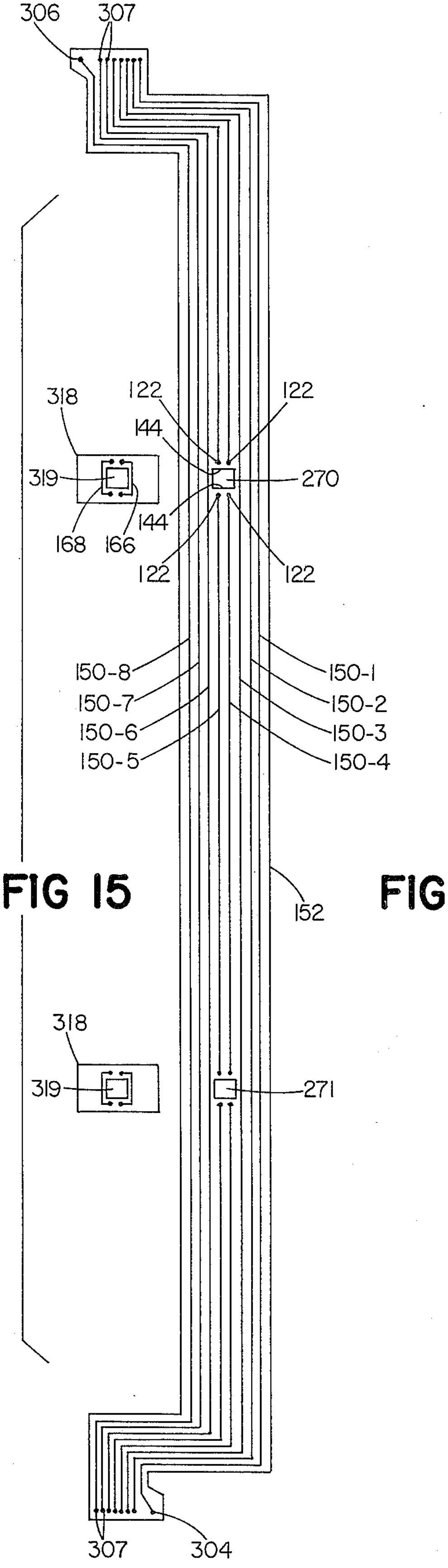
FIG. 15 is a plan view of the unfolded C-field coil.

Referring first to FIG. 15, the conductors of solenoid 22 are etched by well-known printed circuit techniques from a thin copper layer bonded to a base 152 of polyimide material approximately 0.002 inches thick. The general shape of the base material 152 and a pattern of eight uniformly-spaced conductors 150-1 through 150-8 is shown in FIG. 15. Eyelet holes 307 are provided at each end of the conductors 150. This printed circuit solenoid provides thin, wide, and closely spaced conductors of very uniform cross sectional area and constant conductivity.

The printed circuit solenoid is assembled into a generally rectangular loop as shown particularly in FIG. 14, with the eyeleted ends of conductors 150 offset one conductor in registry so that the completed conducting path will form a one-layer spiral winding of equally spaced helical turns. Electrical connection at each of the offset, but otherwise registered, ends of conductors 150 is made by soldering using indium washers (not shown) and secured by rivets 308 inserted through the eyelet holes. Electrical connection to the solenoid is made by wire leads soldered to eyeletted pads 304 and 306 at the end of each of the outside turns.

The closed loop includes two end sections 140 and 142 that are transverse to the beam path and parallel to one another. Since the assembled solenoid winding must lie generally in the plane of the cesium beam, apertures 270 and 271 are provided in end sections 140 and 142 of such a size as to interrupt conductors 150-4 and 150-5.

Aperture 270 in base layer 152 has two opposed edges 144 (FIG. 15) that interrupt the two adjacent inner strips 150-4 and 150-5 of continuous conductor 150, to provide four internal ends 122 of strips 150-4 and 150-5 adjacent the aperture edges. Ends 122 are eyeletted. To provide a continuous current path, it is necessary to bridge the aperture by connecting the internal conductor ends. In addition, it is necessary to maintain uniformity of the C-field at the beam apertures insofar as is possible, to avoid field discontinuities causing undesired transitions, as previously explained.

In the present invention, two patches 318 of printed circuit material similar to that described are provided to bridge the gaps and maintain uniformity of the C-field, each having an aperture 319. Two eyeletted conducting jumpers 166 and 168 are bonded to base layer 320, and angle around aperture 319. Referring particularly to FIGS. 14 and 17, a patch 318 is assembled to the winding by soldering to rivets 182 passing through the eyelets of the jumpers and of internal ends 122. This construction maintains the continuous current path through the entire conductor 150 at the beam apertures. Jumpers 166 and 168 lead the current around each aperture 270 and 271, effectively doubling the magnetizing force at the edges of the apertures and tending to maintain a near uniform distribution of the C-field across the apertures. This structure provides an exceedingly close approximation to the ideal of a uniformly-distributed current sheet.

Electrical insulation around the solenoid is provided by polyimide strips 184 and 186 (FIG. 14) made to the same shape as printed circuit base 152, one being placed on either side of base piece 152.

Inner Magnetic Shield Package

Figure 18:
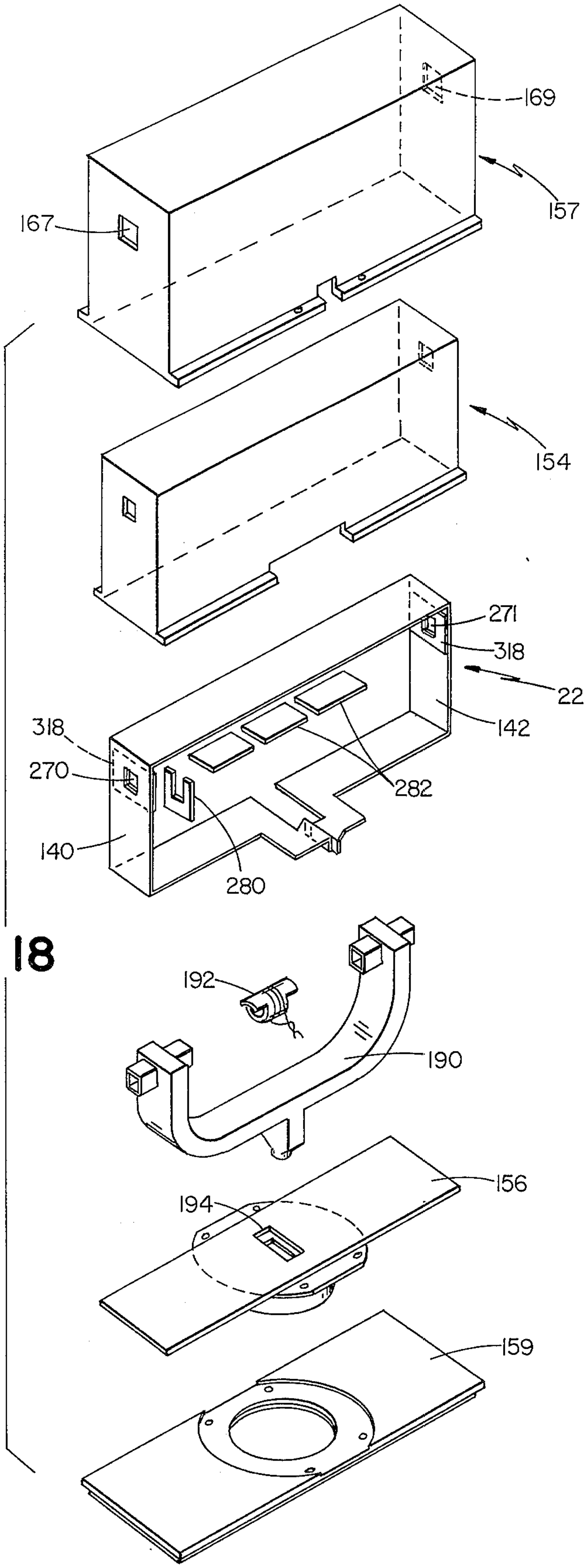
FIG. 18 is an exploded view of the magnetic shield package and contents.

The assembled C-field winding 22, comprising the three layers and two patches as described, is mounted on the inner surface of inner magnetic shield 154 (FIG. 18) and inner shield base plate 156 and is held in place by rivets passing through the shield material, the outer margins of the solenoid assembly of base material 152 and insulating strips 184 and 186, and aluminum plates 282 of which representative ones are shown in FIG. 18. The assembly at the aperture locations 270 and 271 is made with aluminum plates 280 that provide apertures to register with apertures 270 and 271.

A flop coil 192 (FIGS. 2 and 18) is mounted on one of the central aluminum plates 282 and supported from inner magnetic shield 154 so that it is coaxial to the beam axis. This coil is used in a manner well known to the prior art to introduce a 20 khz. electrical signal for the adjustment of the C-field solenoid current, and will not be described further.

The sides of inner magnetic shield 154 (FIG. 18), paralleling the beam path, provide magnetic end caps for solenoid 22. The resulting field across the plane of solenoid 22 thereby approximates the classical uniform field of an infinitely long solenoid with flux lines normal to the cesium beam path. Inner magnetic shield 154 in combination with spaced outer magnetic shield 157 effectively attenuates the strong magnetic fields produced by the A and B magnets and also shields the RF transition region from external magnetic perturbations.

Microwave radiation

Referring particularly to FIGS. 1, 2 and 18, microwave radiation is supplied within RF interaction section 14 by waveguide structure 190, which is of the standard "Ramsey" type and well known in the art. It will not be described here.

In prior art atomic beam tubes, constructed with separate mechanical protective and vacuum isolation envelopes differential motions between the two envelopes have made it necessary to provide flexible connection means between the microwave structure and the exterior of the tube, capable of accommodating to such motions. Such flexible means requires a relatively large aperture, typically two inches in diameter, in the magnetic shield structure to accommodate the connection. Such a large aperture introduces perturbations in the magnetic C-field due to leakage effects, which must in turn be compensated for, for example by providing extra "baffling means" as in U.S. Pat. No. 3,670,171.

In the present invention, the combination of mechanical support and vacuum isolation envelope into a single structure eliminates such differential motions. The inlet arm of microwave structure 190 can therefore be intimately brazed to the lower surface of inner shield base plate 156. This construction avoids the need for a large aperture through the magnetic shield; a relatively small aperture 194, about 1 inch × ½inch, is provided in base plate 156 (FIG. 18). Such a small aperture introduces only relatively small perturbations into the C-field, eliminating the need for "baffling" or other compensating structure, and this structure is therefore advantageous.

Outer magnetic shield package

Figure 19:
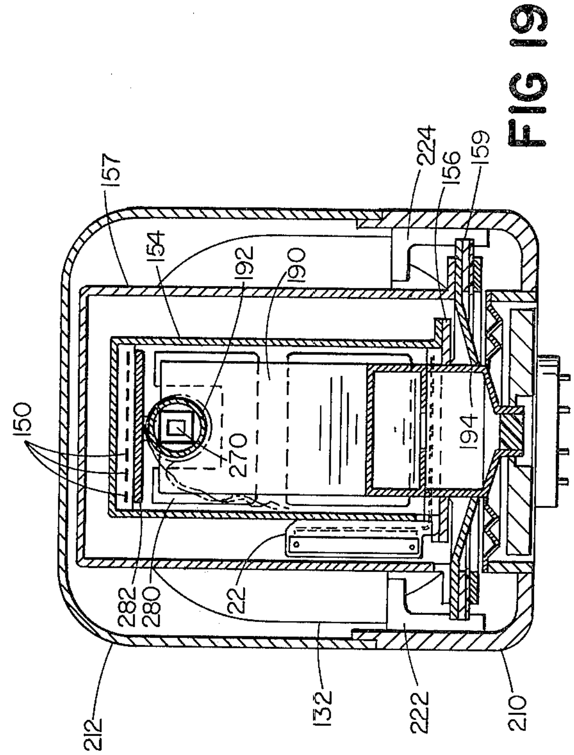
FIG. 19 is a cross section of the outer envelope and contents near the center.
Figure 16:
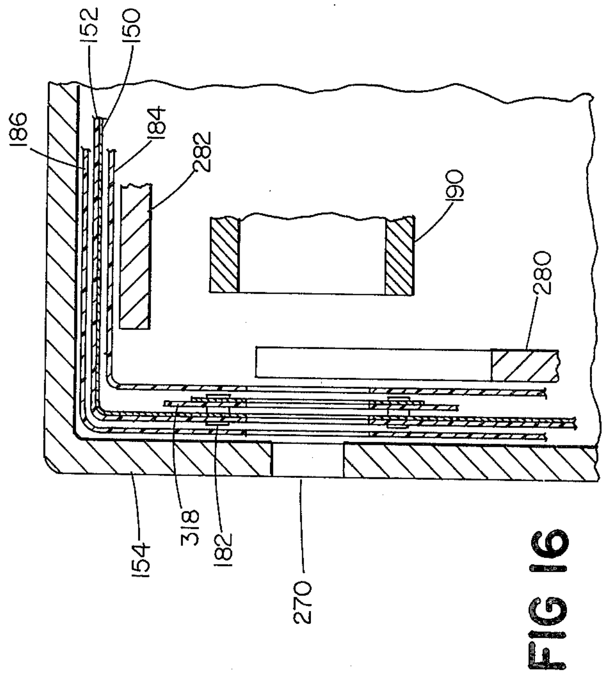
FIG. 16 is a cross section of the assembled C-field coil at a beam aperture.

Referring particularly to FIGS. 18 and 19, inner magnetic shield package is contained within an outer magnetic shield 157 and outer base plate 159. Apertures 167 and 169 are provided from the cesium beam. The entire unit of outer and inner magnetic shield packages, with the contained RF transition section, forms the C-field/microwave structure module 179 (FIG. 24).

Second state selector (B-magnet)/detector module

Referring now to FIGS. 20–23, permanent magnets 198 and 199, each generally of horseshoe form, are secured to a detector table 196, and lie in a horizontal plane containing the beam axis. Magnets 198 and 199 are assembled to provide two gaps spaced about 180° apart, one gap being downstream of RF transition section 14 on the beam axis and the other slightly offset therefrom and downstream of the first. Soft iron pole pieces 200 and 201, whose configurations are identical to those of the A-magnet pole pieces, are provided in the first gap between permanent magnets 198 and 199, on the beam axis. Pole pieces 200 and 201 are driven by magnets 198 and 199, and act as the second state selector (or B-magnet) 16. A second pole piece assembly 204 is provided in the second gap between permanent magnet pieces 198 and 199, slightly offset laterally from the beam axis and downstream from the first gap; pole piece assembly 204 is driven by permanent magnets 198 and 199 to function as a mass spectrometer 207. Thus the second state selector and the mass spectrometer are driven in series by a single pair of permanent magnet pieces 198 and 199. This combination contributes to making the cesium beam tube of the present invention smaller and lighter than prior art atomic beam tubes.

Detector table 196 is provided with three mounting tabs to which is secured a hot wire ionizer assembly 21 including hot wire 20. An electron multiplier and shield assembly 18 is secured beneath detector table 196, and aperture 203 is provided in table 206, corresponding with an aperture 205 in the electron multiplier shield. The B-magnet 16, mass spectrometer 207, hot wire ionizer assembly 21 and electron multiplier assembly 18 together make up B-magnet/detector module 244 (FIG. 24).

The beam of cesium atoms that emerges from the RF transition section 14 (FIG. 2) contains certain atoms that have undergone a transition and other atoms to be discarded. The atoms selected by second state selector or B-magnet 16 strike the hot wire 20, which is of a standard type and will not be further described. Hot wire 20 strips an electron from each neutral cesium atom that strikes it, and re-emits a positively charged cesium ion. The cesium ions are then sorted by mass spectrometer 207 from impurities unavoidably emitted by hot wire 20 and are directed into electron multiplier 18, which produces an amplified output proportional to the number of atoms incident upon the first dynode of the multiplier.

Outer package

Referring particularly to FIGS. 24 and 25, the outer package of the atomic beam tube of the invention is a single vacuum tight envelope composed of a rigid base 210 (FIG. 24), made of ⅛ inch thick stainless steel, and a relatively thin and flexible cover 212 made of 1 mm thick stainless steel. Base 210 provides the necessary ports with vacuum tight feed-through connections to power and RF sources, which are standard and will not be described in detail. The three main subassemblies or modules 179, 240 and 244, which have previously been described in detail, are secured to base 210.

In assembly, oven/A-magnet module 240 is secured to supports 222 and 224 on base 210 by two machine screws 400. Thus the path for heat conduction from oven 10 to the exterior environment of the cesium tube extends through open brackets 134 and 136 and supports 222 and 224 to frame 210. This structure provides a relatively long thermal path and aids in isolating oven 10 from the outside environment.

The C-field/microwave structure module 179 is secured to four posts 226 by four machine screws 228. B-magnet/detector module 244 is secured to brackets 234 and 236 by four machine screws 237. Detector table 196 and brackets 234 and 236 together provide a relatively long thermal path from ionizer 20 to the environment outside the beam tube.

Cover 212 is welded to base 210 after the necessary connections have been made to the feed-through connectors. The tube is then evacuated under high temperature conditions.

This modular construction of the beam tube, with each module or subassembly individually secured at a minimum of points to the rigid frame of the single envelope structure, provides alignment and support for the modules while simultaneously providing thermal isolation and mechanical protection of the components in the modules from the outside environment. at the same time, the relatively flexible cover accommodates to thermal and mechanical stresses induced by the welding operation; an outer structure entirely of the thicker material would not provide this flexibility, and alignment difficulties would result.

What is claimed is:

1. In a molecular beam tube apparatus including a source for providing a directed beam of molecular particles, a first state selector for selecting a portion of said particles in said beam, a radio frequency transition section downstream from said first state selector for causing resonance transitions of some of said selected beam particles, means for producing a weak generally homogeneous magnetic field in said radio frequency transition section, a second state selector downstream from said radio frequency transition section for selecting a further portion of said beam comprising those beam particles that have undergone said resonance transitions, and detecting means responsive to said particles in said further portion, that improvement wherein said source includes collimating means and oven means for providing cesium vapor to said collimating means, said oven means including a reservoir providing a reservoir space communicating with said collimating means a cesium ampoule retained within said reservoir, containing liquid cesium, and comprising an enclosure having an opening a base within said reservoir space and closing said enclosure opening, a eutectic seal between said base and said enclosure securing said base into closing relationship with said enclosure opening, and heating means for heating said ampoule to a temperature effective to vaporize the cesium and cause said eutectic seal to fail mechanically, whereby the cesium vapor pressure causes said base to move outwardly of said enclosure within said reservoir space, opening said ampoule and providing communication therefrom through said reservoir space to said collimating means.

2. The improvement of claim 1, further including biasing means biasing said base outwardly from said enclosure whereby said biasing means prevents said base from reseating within said enclosure opening after the vapor pressure within said enclosure is reduced.

3. In a molecular beam tube apparatus including a source for providing a directed beam of molecular particles, a first state selecting a portion of said particles in said beam, an ion pump for maintaining vacuum within said apparatus, a radio frequency transition section downstream from said first state selector for causing resonance transitions of some of said selected beam particles, means for producing a weak generally homogeneous magnetic field in the radio frequency transition section, a second state selector downstream from said radio frequency transition section for selecting a further portion of said beam comprising those beam particles that have undergone said resonance transitions, and detecting means responsive to said particles in said further portion, that improvement wherein said apparatus provides a generally C-shaped permanent magnet having a curved inner surface and having an axis parallel with aid directed beam, said permanent magnet providing a gap and further including two opposed reentrant portions extending inwardly of said inner surface, a first pair of pole pieces placed in the field of said permanent magnet within said gap and providing a deflecting field, and a second pair of pole pieces placed between said reentrant portions, said ion pump being located between said second pair of pole pieces, whereby said first pair of pole pieces is driven by said permanent magnet to provide said first state selector, and said second pair of pole pieces and said permanent magnet drive said ion pump in parallel with said first state selector.

4. In a molecular beam tube apparatus including a source for providing a directed beam of molecular particles, a first state selector for selecting a portion of said particles in said beam, a radio frequency transition section downstream from said first state selector for causing resonance transitions of some of said selected beam particles, C-field means for producing a weak generally homogeneous magnetic field transverse to said beam in the radio frequency transition section, a second state selector downstream from said radio, frequency transition section for selecting a further portion of said beam comprising those beam particles that have undergone said resonance transitions, and detecting means responsive to said particles in said further portion, that improvement wherein said C-field means comprises a conductor including a plurality of equally spaced helical turns forming a generally closed loop lying generally in a beam plane including the path of said directed beam, said loop including two end sections transverse to said beam path and parallel to one another, each said end section including a beam aperture having first and second opposed edges interrupting said conductor in at least two adjacent said helical turns to provide two internal ends adjacent each of said opposed beam aperture edges, at least two conducting jumpers adjacent a said beam aperture, each said jumper having a first jumper end connected to a said helical turn internal end adjacent said first aperture edge, and a second jumper end connected to the said internal end of the same said helical turn adjacent said opposed second edge, whereby said conductor provides a continuous conducting path through said helical turns and said jumpers around said beam apertures, and said magnetic field adjacent a said aperture has greater strength than at other portions of said loop.

5. In a molecular beam tube apparatus including a source for providing a directed beam of molecular particles a first state selector for selecting a portion of said particles in said beam a radio frequency transition section downstream from said first state selector for causing resonance transitions of some of said selected beam particles means for producing a weak generally homogeneous magnetic field in said frequency transition section a second state selector downstream from said radio frequency transition section for selecting a further portion of said beam comprising those beam particles that have undergone a said resonance transition and detecting means responsive to said particles in said further portion of said beam, including a mass spectrometer, that improvement wherein said apparatus provides a pair of generally horseshoe shaped permanent magnets oriented to provide two gaps spaced about 180° apart, a first said gap being downstream of said radio frequency transition section in the path of said beam, and a second said gap being downstream of the first, a first pole piece assembly within said first gap and driven by said permanent magnets, and a second pole piece assembly within said second gap and driven by said permanent magnets, whereby said first pole piece assembly provides said second state selector, and said second pole piece assembly provides said mass spectrometer in said detecting means, the magnetic circuits of said second state selector and said mass spectrometer being in series.

6. Molecular beam tube apparatus comprising enclosure means, a source for providing a beam of molecular particles a first state selector for selecting a portion of said particles in said beam a radio frequency transition section downstream from said first state selector for causing resonance transitions of some of said selected beam particles means for producing a weak generally homogeneous magnetic field in the radio frequency transition section a second state selector downstream from said radio frequency transition section for selecting a further portion of said beam comprising those beam particles that have undergone said resonance transitions, and detecting means responsive to said particles in said further portion, said source and said first state selector together comprising a first subassembly, said radio frequency transition section and said means for producing a weak field together comprising a second subassembly, and said second state selector and said detecting means together comprising a third subassembly, said enclosure means comprising a rigid frame and a flexible cover, said frame and cover being sealed together to form a vacuum envelope, said three subassemblies being separately and removably secured to said frame.

* * * * *